United States Patent [19]

Fels et al.

[11] Patent Number: 5,623,168
[45] Date of Patent: Apr. 22, 1997

[54] REDUCTION OF THE GRAIN SIZE OF CRYSTALLINE EXPLOSIVE

[75] Inventors: Gregor Fels; Gerhard Ewald, both of Haltern, Germany

[73] Assignee: Wasagchemie Sythen GmbH, Haltern, Germany

[21] Appl. No.: 204,323

[22] PCT Filed: Aug. 28, 1992

[86] PCT No.: PCT/EP92/01990

§ 371 Date: Mar. 7, 1994

§ 102(e) Date: Mar. 7, 1994

[87] PCT Pub. No.: WO93/06065

PCT Pub. Date: Apr. 1, 1993

[30] Foreign Application Priority Data

Sep. 18, 1991 [DE] Germany ............... 41 31 072.1
Jan. 14, 1992 [DE] Germany ............... 42 00 743.7

[51] Int. Cl.⁶ ............... C06B 21/00; A45C 1/02
[52] U.S. Cl. ............... 264/3.6; 264/3.4; 149/111; 149/115
[58] Field of Search ............... 264/3.4, 3.6; 149/111, 149/115

[56] References Cited

U.S. PATENT DOCUMENTS

| | | | |
|---|---|---|---|
| 1,801,509 | 4/1931 | Jackman | 149/2 X |
| 2,204,059 | 6/1940 | Acken | 260/467 |
| 2,346,116 | 4/1944 | Snelling | 52/22 |
| 2,421,778 | 6/1947 | Fleischer et al. | 52/2 |
| 2,867,647 | 1/1959 | Gow et al. | 260/467 |
| 3,173,818 | 3/1965 | Holloway et al. | 149/35 |
| 3,685,835 | 1/1972 | Peterson | 235/315 |
| 3,952,655 | 4/1976 | Kusakabe et al. | 102/23 |
| 3,954,526 | 5/1976 | Mangum et al. | 149/7 |
| 4,088,518 | 5/1978 | Kehren et al. | 149/11 |
| 4,150,900 | 4/1979 | Smith, Jr. et al. | 366/302 |
| 4,657,607 | 4/1987 | Perotto et al. | 149/19.4 |
| 4,981,535 | 1/1991 | Haderman et al. | 149/19.92 |
| 4,983,235 | 1/1991 | Nygvist et al. | 149/109.6 |
| 5,057,553 | 10/1991 | Zagefka et al. | 523/180 |
| 5,250,687 | 10/1993 | Lukasyage et al. | 544/215 |

FOREIGN PATENT DOCUMENTS

| | | |
|---|---|---|
| 733552 | 3/1943 | Germany . |
| 1072169 | 12/1959 | Germany . |
| 1944459 | 3/1971 | Germany . |
| 2336004 | 2/1975 | Germany . |
| 2335251 | 2/1977 | Germany . |
| 3617408 | 6/1987 | Germany . |
| 4012417 | 10/1991 | Germany . |
| 473057 | 11/1937 | United Kingdom . |

*Primary Examiner*—Peter A. Nelson
*Attorney, Agent, or Firm*—Bell, Seltzer, Park & Gibson, P.A.

[57] ABSTRACT

Reduction of the grain size of crystalline explosive.

A method and an apparatus for reducing the grain size of crystalline explosive provide for, first of all, dissolving the coarse crystalline explosive in an organic solvent. Subsequently, the dissolved explosive is brought together with ice water in a precipitation reactor. In the precipitation reactor the precipitation and crystallization of the explosive occur, while turbulent agitation takes place. A filtration stage is connected downstream of the precipitation reactor. A fine crystalline explosive is obtained, having a mean particle size of from 4 to 6 micrometers.

12 Claims, 1 Drawing Sheet

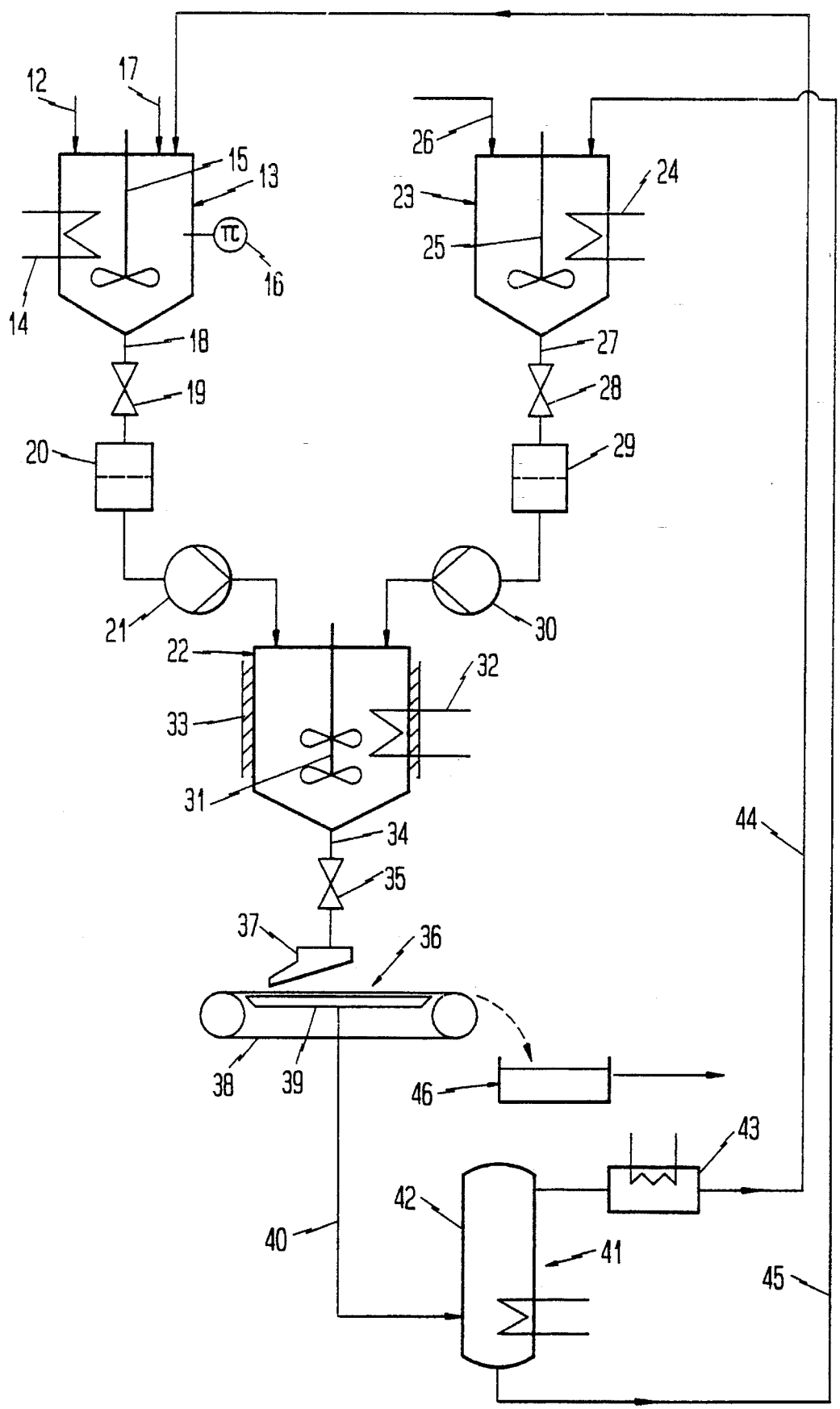

REDUCTION OF THE GRAIN SIZE OF CRYSTALLINE EXPLOSIVE

BACKGROUND OF THE INVENTION

The invention relates to a method of and an apparatus for reducing the grain size of crystalline explosive, especially hexogen or mixtures containing hexogen, wherein the explosive is dissolved in an organic solvent, the dissolved explosive subsequently is precipitated and crystallized in the presence of water, and then the resulting recrystallized explosive is separated from solvent and water.

In the context of the present application, crystalline explosive, in the first place, is understood to be hexogen (RDX), also octogen (HMX) and nitropenta (PETN), but also any other explosive which is available in crystalline form as well as mixtures of such explosives.

The final product in the preparation of hexogen and other crystalline explosives is obtained in coarse crystalline form. For many cases of application, however, the crystalline explosive is required to be in fine crystalline form, especially if it is a constituent of a propellant charge powder.

In the case of a known method of reducing the grain size, the crystalline explosive is ground in a mill while liquid is being added. The mechanical crushing of the violent explosive is to be classified as dangerous in spite of the addition of liquid. Moreover, with the known method, the separation of the fine fraction can be accomplished with difficulty only.

A method of the kind mentioned initially is already known from European patent application 0 340 188 by means of which the average grain size of hexogen and other crystalline explosives can be reduced to a mean particle size of less than 20 micrometers. With the known method, the explosive, such as hexogen is dissolved in a solvent and water at a temperature between 60° C. and 70° C. and while being stirred. The explosive solution is conveyed into a steam ejector, while being pressurized by nitrogen. In the ejector, crystallization takes place, the solvent evaporating and the explosive precipitating. The precipitated crystalline explosive then is separated in a downstream cyclone. A mean particle size of 8 micrometers is said to be obtainable by the known process.

It is the object of the invention to propose a method and an apparatus by means of which very small grain sizes can be obtained and with which a very high degree of safety in application is achieved.

SUMMARY OF THE INVENTION

The above and other objects of the invention are achieved by the provision of a method which comprises the steps of dissolving the explosive in an organic solvent, precipitating the dissolved explosive by bringing the dissolved explosive together with cold water, while turbulently agitating the mixture of the explosive, water, and solvent, and then separating the resulting precipitated explosive from the solvent and the water. In accordance with the present invention, the precipitating step includes adding a precipitant to the mixture to retard crystal growth and which is selected from at least one of the group consisting of (1) a decomposition product of starch, (2) derivatives of starch or cellulose which are soluble in water, and (3) greatly diluted solutions of different sugars. Also, the separating step includes adding a wetting agent to the mixture of the explosive, water, and solvent, before and/or during the separation to prevent agglomeration of the solid particles.

The method according to the invention provides for the explosive solution to be brought together with cold water. Under turbulent agitation, the precipitation and crystallization of the explosive take place. The explosive is yielded in fine crystalline form. In the case of hexogen, mean grain sizes of from 4 to 6 micrometers can be obtained by the method according to the invention. The resulting final product, which still needs to be separated from solvent and water after crystallization, is characterized by great handling safety. The method according to the invention, furthermore, offers a high degree of safety in application.

According to a further development of the invention the cold water has a temperature of below 3° C. Conveniently, ice water is used for this purpose which is prepared in a separate ice water container. Also the vessel in which precipitation and crystallization take plate is cooled advantageously.

The method according to the invention readily can be carried out continuously in a reactor, which is fed continuously with explosive solution and cold water and from which precipitated explosive is withdrawn continuously.

A particularly important further development of the invention resides in the addition of a precipitant for precipitation of the explosive which precipitant retards crystal growth. In this manner an explosive of especially small particle size is obtained from the crystallization. A decomposition product of starch, preferably dextrin is used to advantage as the precipitant. Yet derivatives of starch or cellulose which are soluble in water and/or greatly diluted solutions of different sugars also may be used as precipitating agent. The addition of the precipitant advantageously occurs at a concentration of from 0.1 to 3% by weight, preferably from 0.5 to 1% by weight, based on the explosive used. The precipitant advantageously is fed to a precipitation reactor together with the cold water or ice water, with dissolved explosive being added to the same as well. The precipitant retards or impedes crystal growth and leads to more uniformly rounded crystals. Especially the use of dextrin proved to be advantageous since the addition of dextrin has a phlegmatizing effect in that it greatly reduces or totally eliminates the static charging of the dry explosive and, moreover, reduces the sensitivity to friction of the explosive. It is preferred to use a white dextrin. White dextrins are closely related to starch when it comes to their characteristics. They consist predominantly of shortened molecule chains with little branching and can be dissolved quickly in water without lumping.

For best exploitation of the solvent used, it is advantageous if the dissolution of the explosive takes place at a temperature which is just below the boiling point of the solvent. Ketones, preferably almost anhydrous acetone, can be used to advantage as solvents. When using acetone, the optimum ratio between the acetone used and the water used is approximately 3%. If the amount of water is less, the crystallization may suffer. Greater quantities of water are possible, yet they render the recovery of the acetone by distillation unnecessarily uneconomical.

In further modifying the invention, it is provided to filter the resulting mixture of explosive, solvent, and water so as to separate the precipitated explosive. The filtration can be carried out, for example, on a vacuum belt filter.

It is advantageous to add a wetting agent to the mixture of explosive, solvent, and water before and/or during the filtration in order to prevent agglomeration during the subsequent drying. A mixture of anionic and non-ionic surfactants may be used advantageously as wetting agent.

It is advantageous to treat the filtrate obtained from the filtration so as to recover the solvent it contains in order to achieve an especially economical procedure. That may be done, for instance, in a distillation process succeeding the filtering step.

The apparatus according to the invention is characterized by a reactor in which the precipitation and crystallization of the dissolved explosive take place and which is provided with cooling and a turbulent agitator. The reactor may comprise advantageously built-in baffle plates to increase the turbulence. The cooling preferably should be adjustable so that the crystallization can be carried out at a temperature of from 1° C. to 2° C.

With the apparatus according to the invention, the reactor on the one hand is fed with dissolved explosive and on the other hand with cold water, especially ice water. The precipitation of the explosive then takes place while turbulent agitation is realized. Thereafter, the recrystallized explosive is passed on to a subsequent process in that separation of the solvent and water occur.

According to an advantageous modification it is provided that the reactor is designed with continuous feeding of dissolved explosive and cold water and continuous discharge of the recrystallized explosive.

In further modification, at least one solid-liquid separating means, especially a vacuum belt filter is connected downstream of the reactor. Here the separation of the precipitated explosive takes place. A means for supplying a wetting agent is provided advantageously at the belt filter.

The solid-liquid separating means may comprise a filtrate collecting means which is connected advantageously with a means for recovery of the solvent in the filtrate. The recovering means conveniently comprises a distilling means in which the solvent contained in the filtrate is separated.

BRIEF DESCRIPTION OF THE DRAWINGS

Further features and advantages of the invention may be gathered from an embodiment of an apparatus according to the invention illustrated in the drawing. The drawing shows a schematic flow diagram of the apparatus according to the invention.

DETAILED DESCRIPTION OF THE PREFERRED EMBODIMENT

The apparatus diagrammatically illustrated in the drawing is suitable for producing fine crystalline hexogen from coarse crystalline hexogen (RDX) which also may contain a share of octogen. In particular, the apparatus shown and the method steps carried out in the same are suitable for producing fine crystalline hexogen having a mean grain size of from 4 to 6 micrometers.

The coarse crystalline hexogen, phlegmatized with at least 15% of water, is supplied to a solvent container 13 by a metering means (not shown) at an inlet 12. The solvent container 13 is provided with a heater means 14 and an agitator 15. Moreover, a temperature controller 16 is provided at the solvent container 13. At an inlet 17 of the solvent container 13 the supply of acetone, anhydrous if at all possible, takes place.

The dissolution of the explosive occurs in the solvent container 13 at a temperature which is slightly below the boiling point of the solvent. The temperature controller 16 thus can be adjusted to approximately 58° C., for example, if an almost anhydrous acetone is used as the solvent.

The dissolved explosive subsequently is fed through an outlet 18 and a valve 19 to a filter 20. A metering pump 21 then conveys the dissolved explosive to a precipitation reactor 22.

Cold water or ice water is prepared in an ice water container 23 which is provided with a cooling means 24 and an agitator 25. At an inlet 26 of the ice water container 23, a dextrin solution is added to the ice water which has a temperature of below 3° C. An addition of dextrin of from 0.5 to 1% by weight based on the explosive used is added. Preferably, a white dextrin is used. White dextrins are closely related to starch in respect of their properties. They consist predominantly of shortened molecule chains with little branching and can be dissolved quickly in water without lumping. Instead of dextrins, other water-soluble derivatives of starch or cellulose may be used as precipitants. Also greatly diluted solutions of different sugars may be used.

The precipitant supplied to the ice water container 23 is mixed by the agitator 25 with the ice water. The mixture of ice water and precipitant is fed by another metering pump 30 through an outlet 27, a valve 28, and a filter 29 to the precipitation reactor 22.

The precipitation reactor 22 comprises built-in baffle plates and an agitator 31 which permits turbulent stirred introduction. Moreover, a cooling means 32 is provided at the precipitation reactor 22. An insulation 33 is applied to the outside wall of the precipitation reactor 22.

In the precipitation reactor 22 the dissolved explosive is brought together with the ice water contained in the precipitant, while being stirred turbulently. The precipitation of the explosive occurs at a temperature of less than 10° C. At this time the dextrin additive retards or impedes the crystal growth and leads to more uniformly rounded crystals. The precipitation and crystallization taking place with this process design yield an explosive which is available in finely crystallized form.

The resulting mixture of explosive, solvent, and water is fed through an outlet 34 provided at the precipitation reactor 22 and a valve 35 to a vacuum belt filter 36, for example. Feeding of the mixture occurs through a supply means 37 which is arranged above the belt 38 of the vacuum belt filter. The resulting filtrate is fed through a suction means 39 and a conduit 40 to a recovering means 41 for the solvent contained in the filtrate. In the embodiment illustrated, the recovering means 41 is designed as a continuously operated distilling means. The separation of the solvent contained in the filtrate takes place in a distilling column 42. The solvent is condensed at a condenser 43 and recycled through a conduit 44 into the solvent container 13. The process water accumulating at the distilling column 42 is recycled through a conduit 45 into the ice water container 23.

The addition of the wetting agent takes place at the vacuum belt filter 36 by a means not shown. Anionic and non-ionic surfactants are used as wetting agents in the case of the embodiment illustrated. The wetting agent largely prevents the solid particles from agglomerating especially during the drying of the solids obtained.

The explosive obtained is passed from the vacuum belt filter 36 into a collecting vessel 46. The static charging of the dry explosive or hexogen can be greatly reduced or suppressed altogether by the dextrin additive. The dextrin additive thus also has a phlegmatizing effect. Furthermore, the sensitivity to friction of the explosive is reduced as well.

The method specified above readily may be carried out continuously. It is characterized by a high degree of safety in application. The explosive obtained in fine crystalline form is available at a mean grain size of from 4 to 6 micrometers. Therefore, the explosive obtained is suitable for many applications, e.g. as component of a propellant charge powder.

We claim:

1. A method of reducing the grain size of a crystalline explosive, such as hexogen or mixtures containing hexogen, and comprising the steps of dissolving the explosive in an organic solvent, precipitating and crystallizing the dissolved explosive in the presence of water, then separating the resulting precipitated explosive from the solvent and the water, and characterized in that the dissolved explosive is precipitated by bringing the dissolved explosive together with cold water, while turbulently agitating the mixture of the explosive, water and solvent, and wherein the precipitating step includes adding a precipitant to said mixture to retard crystal growth and which is selected from at least one of the group consisting of (1) a decomposition product of starch, (2) derivatives of starch or cellulose which are soluble in water, and (3) greatly diluted solutions of different sugars, and the separating step includes adding a wetting agent to the mixture of the explosive, water, and solvent, before and/or during the separation to prevent agglomeration of the solid particles.

2. The method as claimed in claim 1, characterized in that the cold water has a temperature of below 3° C.

3. The method as claimed in claim 1, characterized in that the precipitating step is carried out in a reactor which is fed continuously with explosive solution and cold water and from which precipitated explosive is withdrawn continuously.

4. The method as claimed in claim 1, characterized in that the precipitant is added at a concentration of from 0.1 to 3% by weight, based on the explosive used.

5. The method as claimed in claim 1, characterized in that the precipitating step is carried out at a temperature of less than 10° C.

6. The method as claimed in claim 1, characterized in that the step of dissolving the explosive in the solvent occurs while heat is supplied and stirring effected.

7. The method as claimed in claim 6, characterized in that the step of dissolving the explosive occurs at a temperature just below the boiling point of the solvent.

8. The method as claimed in claim 1, characterized in that the solvent is a ketone.

9. The method as claimed in claim 8, characterized in that the solvent is acetone and the acetone and cold water are used at a volume ratio of approximately $3/10$.

10. The method as claimed in claim 1, characterized in that the separating step includes filtering the resulting mixture of explosive, solvent, and water to separate the precipitated explosive.

11. The method as claimed in claim 1, characterized in that the wetting agent is a mixture of anionic and non-ionic surfactants.

12. The method as claimed in claim 11, characterized in that the filtrate obtained from the filtering step is treated so as to recover the solvent.

* * * * *